Figure 1:
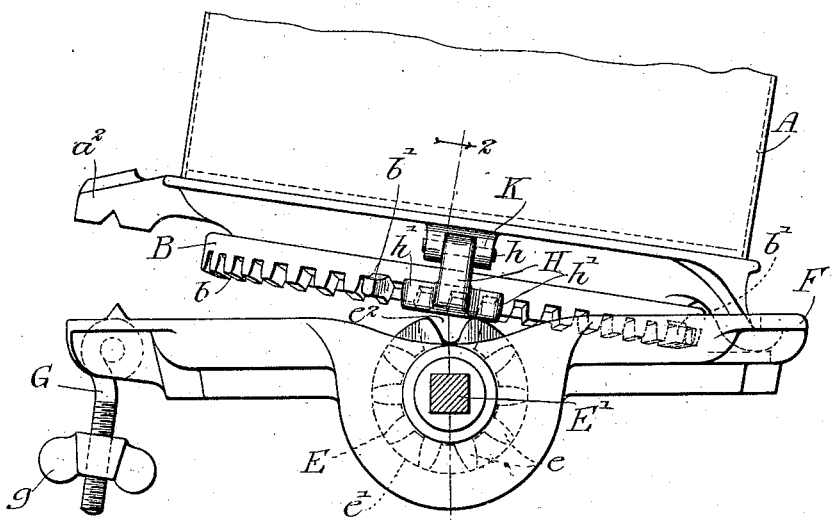

No. 842,642. PATENTED JAN. 29, 1907.
G. P. FISHER, Jr.
PLANTER.
APPLICATION FILED DEC. 27, 1906.

UNITED STATES PATENT OFFICE.

GEORGE P. FISHER, JR., OF CHICAGO, ILLINOIS.

PLANTER.

No. 842,642.  Specification of Letters Patent.  Patented Jan. 29, 1907.

Application filed December 27, 1906. Serial No. 349,641.

*To all whom it may concern:*

Be it known that I, GEORGE P. FISHER, Jr., a citizen of the United States, residing at Chicago, in the county of Cook and State of Illinois, have invented certain new and useful Improvements in Planters, of which I declare the following to be an exact, full, and clear description, reference being had to the accompanying drawings, forming part of this specification.

The present invention has relation more particularly to that class of corn-planters in which the seed to be planted is carried by seed boxes or hoppers having feeding mechanism at their bottoms and adapted to be lifted out of gear with their drive-pinions whenever it is desired to change the seed-plates or empty the boxes. In this class of planters it is desirable that some provision be made whereby when the seedboxes (after having been lifted) are returned to operative position the gearing shall be properly intermeshed so as to accurately time the operation of the seed-plates and prevent breakage of parts. Various provisions have heretofore been made for securing the accurate intermeshing of the gears at the bottoms of the seedboxes with the pinions whereby these gears are driven. Thus, for example, in Traphagen patent, No. 629,730, granted July 25, 1899, the annular gear of each of the seedboxes is provided with a plurality of long teeth or projections adapted to enter corresponding recesses in the flange of the driving-pinion, the arrangement being such that after a seedbox has been removed it cannot be secured in operative position again until one of the long teeth of its annular gear-wheel enters a corresponding notch formed in the flange of the drive-pinion. In corn-planters such as shown in the Traphagen patent the long teeth of the annular gear-wheels are arranged so close together that one or another of these long teeth will always come in proper position to engage the notched flange of the driving-pinion. When, however, the long teeth that project from the annular gears of the seedboxes are arranged at considerable distances apart, as in that class of corn-planters in which a quarter of a revolution is imparted to each annular gear and seed-plate to discharge the required number of grains for each hill of corn, the distance between the long teeth of the annular gears is so great that they may span the drive-pinion, and hence, unless provision be made to prevent, it would be possible for the seedboxes to be restored to operative position without their gear-wheels being properly meshed with the drive-pinions. Various provisions have heretofore been made to prevent such annular gear-wheels having widely-separated teeth from being improperly meshed with their drive-pinions. Thus, for example, in Heylman patent, No. 736,257, granted August 11, 1903, the improper seating of the seedbox was prevented by forming a flange upon its frame or support with which flange one or another of the long teeth of the gear-wheel will contact except when the gear-wheel is in proper position to correctly mesh with its drive-pinion.

The present invention is designed to provide a simple and effective means for insuring the proper meshing of the seedbox gear-wheels with their drive-pinions, regardless of the number or distance apart of the long teeth or projections that extend from said gear-wheels for engagement with the drive-pinions.

The invention consists in the features of novelty hereinafter described, illustrated in the accompanying drawings, and more particularly pointed out in the claims at the end of this specification.

Figure 2:
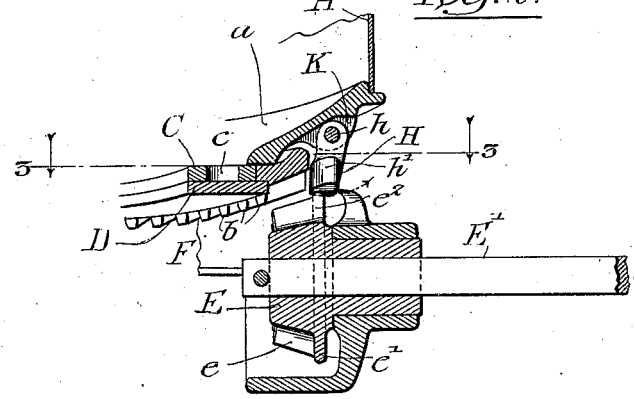
Figure 3:
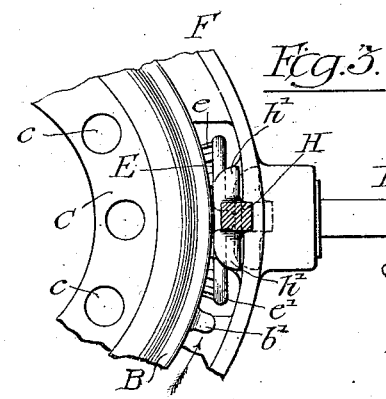

Figure 1 is a view in side elevation showing a portion of one of the seedboxes of a corn-planter and the mechanism whereby its feeding devices are driven, the seedbox being shown raised out of operative position. Fig. 2 is a view in vertical section upon line 2 2 of Fig. 1. Fig. 3 is a view in horizontal section on line 3 3 of Fig. 2, but with the parts in operative position.

As the construction of the type of corn-planters to which this invention relates is well known to those familiar with the art, it has been deemed necessary to illustrate only that part of the mechanism to which the invention particularly relates. It may be stated in passing, however, that the invention is shown as applied to the construction of corn-planter illustrated more particularly in said Heylman patent, No. 736,257, granted August 11, 1903, to which reference may be had for a fuller understanding of the general construction of the machine.

A designates the seedbox or hopper, beneath the bottom flange or rim $a$ of which is arranged in familiar manner the annular gear-wheel B. Within this gear-wheel B sets the seed-plate C, having the seed-openings $c$ formed therein near its periphery. Beneath the seed-plate C is mounted the guard-plate D, by which the openings $c$ of the seed-plate are closed. The annular gear-wheel B is formed with downwardly-facing teeth $b$, adapted to mesh with the teeth $e$ of the drive-pinion E, that is mounted upon the drive-shaft E'. The annular gear-wheel B is provided also with radially-projecting long teeth $b'$, adapted to extend over the flange $e'$ of the drive-pinion E and adapted to enter the notch $e^2$ of the drive-pinion in order to properly position the gear-wheel with respect to the pinion. As shown, the seedbox A is pivotally mounted upon the frame F at one side, and at its opposite side the seedbox is provided with projecting lugs $a^2$, adapted to be engaged by a bolt G and wing-nut $g$ to lock the seedbox in operative position. The parts thus far described correspond in construction to the parts set forth in the Heylman patent, No. 736,257, above mentioned.

In order to prevent the gear-wheel B from being meshed with the drive-pinion E at any time except when one of the long teeth $b'$ of the gear-wheel B is above the notch $e^2$ of the drive-pinion, I have provided a movable dog, the preferred construction and location of which is that illustrated in the accompanying drawings. As shown, the dog H is pivoted, as at $h$, to a lug K, projecting downwardly from the rim $a$ of the seedbox, and the dog is arranged in such location that it will prevent the closing down of the seedbox to operative position until one of the long teeth $b'$ of the gear-wheel B is above the drive-pinion E. Preferably the dog H is arranged above the flange $e'$ of the drive-pinion E and immediately adjacent the periphery of the gear-wheel B in such position that as the long teeth $b'$ of the gear-wheel move past the dog H they will shift this dog from the position shown in Fig. 2 to the position shown by dotted lines in Fig. 3. When the dog H is in the position shown in Figs. 1 and 2, if attempt be made to lower the seedbox, the dog H will contact with the flange $e'$ of the drive-pinion E and prevent the meshing of the teeth $b$ of the gear-wheel with the teeth $e$ of the drive-pinion until the dog H has been moved outward, as indicated by dotted lines in Fig. 3. This moving outward of the dog H is preferably effected by the contact with the dog of a projection or projections on the gear-wheel B and the outward movement or shifting of the dog H is preferably effected by the long teeth $b'$ of the gear-wheel B. To enable the dog H to be more readily shifted by the projecting teeth $b'$, the ends of the dog H are beveled, as at $h'$.

From the foregoing description it will be seen that when the seedbox and its gear-wheel are partially lowered to the position shown in Fig. 1 the gear-wheel B may be turned by hand until one of the projecting teeth $b'$ strikes the dog H and moves it outward, so as to permit such projecting tooth $b'$ to drop into the notch $e^2$ of the drive-pinion, and as the tooth $b'$ thus drops into the notch $e^2$ of the drive-pinion the teeth $b$ of the gear-wheel B will mesh with the teeth $e$ of the drive-pinion.

It is manifest that the details of construction above set out may be varied widely without departing from the scope of the invention. It is not to be understood as restricted to the precise construction of movable dog above illustrated and which is preferably a gravity-dog, nor is it limited to the location of the dog, which obviously may be varied.

Having thus described my invention, what I claim as new, and desire to secure by Letters Patent, is—

1. In a planter the combination with a seedbox, its gear-wheel and its supporting-frame having a drive-pinion, of a movable dog separate from the seedbox gear-wheel and arranged to prevent the improper meshing of the seedbox gear-wheel with its drive-pinion.

2. In a planter the combination with a seedbox, its gear-wheel and its supporting-frame having a drive-pinion of a vertically and laterally movable dog arranged to prevent the improper meshing of the seedbox gear-wheel with its drive-pinion.

3. In a planter the combination with a seedbox and with its gear-wheel having a projection and with the supporting-frame having a drive-pinion of a dog vertically movable with said seedbox and arranged in position to be shifted by the projection on the seedbox gear-wheel.

4. In a planter the combination with a seedbox, its gear-wheel and its supporting-frame having a drive-pinion of a vertically and laterally movable dog arranged to project above the drive-pinion and serving to prevent the improper meshing of the seedbox gear-wheel with its drive-pinion.

5. In a planter the combination with a seedbox and with its gear-wheel having a projection and with the supporting-frame having a drive-pinion of a gravity-dog arranged above and in position to engage the drive-pinion and in the path of said projection on the seedbox gear-wheel.

6. In a planter the combination with a seedbox and with its gear-wheel having a projection and with the supporting-frame having a drive-pinion of a movable dog having a beveled portion adapted to be engaged and shifted by the projection on the seedbox gear-wheel.

7. In a planter the combination with a seedbox and with its gear-wheel having radially-projecting teeth of a pivoted laterally-movable dog carried by the seedbox and arranged in the path of the projecting teeth of the gear-wheel and serving to prevent the improper meshing of the seedbox gear-wheel with its drive-pinion.

8. In a planter the combination with a supporting-frame and pinion and with a seedbox movably mounted upon said frame and having a gear to engage said pinion, said gear and said pinion being provided respectively with projecting teeth and a notched rim, of a movable dog for preventing the improper meshing of the seedbox-gear and the drive-pinion and means for shifting said dog to inoperative position when said gear and pinion are in proper relative position.

GEORGE P. FISHER, JR.

Witnesses:
 MAE C. LINBAUER,
 KATHARINE GERLACH.